United States Patent [19]

Holzel

[11] 3,998,522
[45] Dec. 21, 1976

[54] SCREEN FOR EXHIBITING PROJECTED IMAGES

[75] Inventor: Thomas M. Holzel, New York, N.Y.

[73] Assignee: Intercontinental Satellite Network, Inc., Los Angeles, Calif.

[22] Filed: Mar. 24, 1975

[21] Appl. No.: 561,073

[52] U.S. Cl. .............................. 350/125; 350/295
[51] Int. Cl.² ................... G03B 21/60; G02B 5/10; G03B 21/58
[58] Field of Search .......... 350/117, 125, 295, 296, 350/293

[56] References Cited
UNITED STATES PATENTS

| | | | |
|---|---|---|---|
| 1,330,447 | 2/1920 | Pech | 350/125 |
| 1,526,715 | 2/1925 | Moon et al. | 350/125 |
| 2,753,818 | 7/1956 | Green | 350/125 X |
| 2,906,169 | 9/1959 | Saffir | 350/125 |
| 3,037,424 | 6/1962 | Capetta | 350/125 |
| 3,936,159 | 2/1976 | Pavenick | 350/295 X |

FOREIGN PATENTS OR APPLICATIONS

| | | | |
|---|---|---|---|
| 430,504 | 2/1948 | Italy | 350/117 |
| 112,065 | 10/1944 | Sweden | 350/125 |

Primary Examiner—L. T. Hix
Assistant Examiner—E. M. O'Connor
Attorney, Agent, or Firm—Charles E. Baxley

[57] ABSTRACT

This disclosure teaches a screen such as those generally used for exhibiting projected images. A boxlike frame has a rim formed about its front. A membrane (the projection screen) covers the front with its margin extending to the vicinity of the rim. A cover encloses the back of the frame and is connected in sealed engagement to the margin of the membrane so as to form a plenum. Gas is withdrawn from the plenum whereby the membrane forms a concave image receiving surface curved in a relatively constant degree about a single point so that the image receiving surface takes on a spherical shape.

4 Claims, 4 Drawing Figures

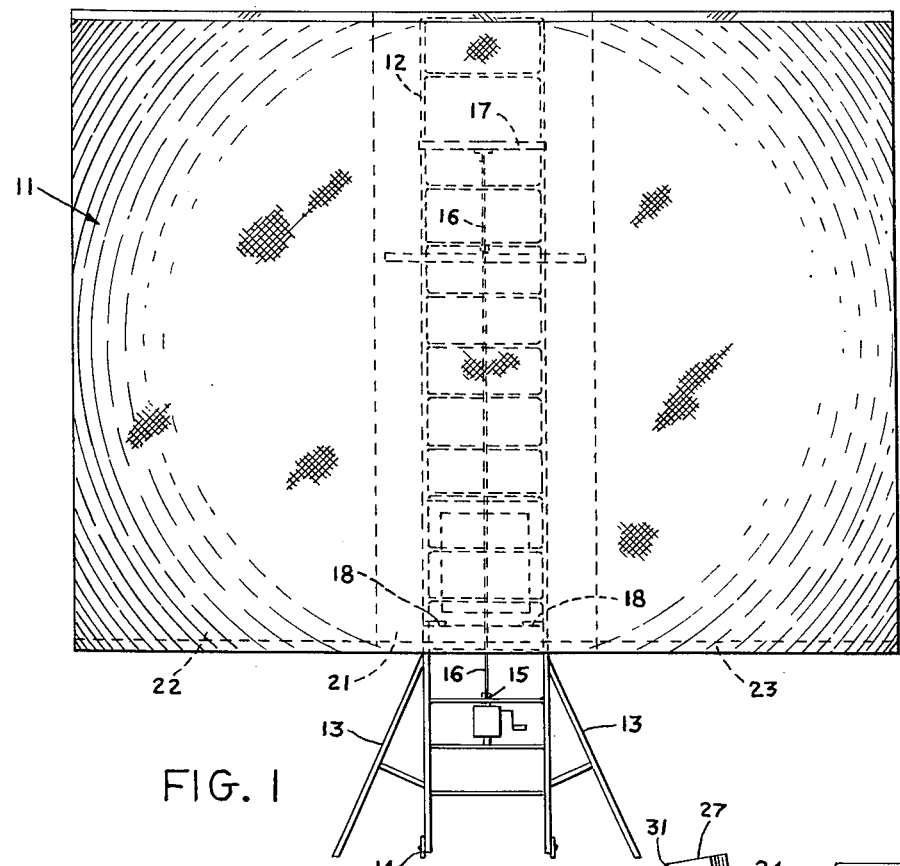
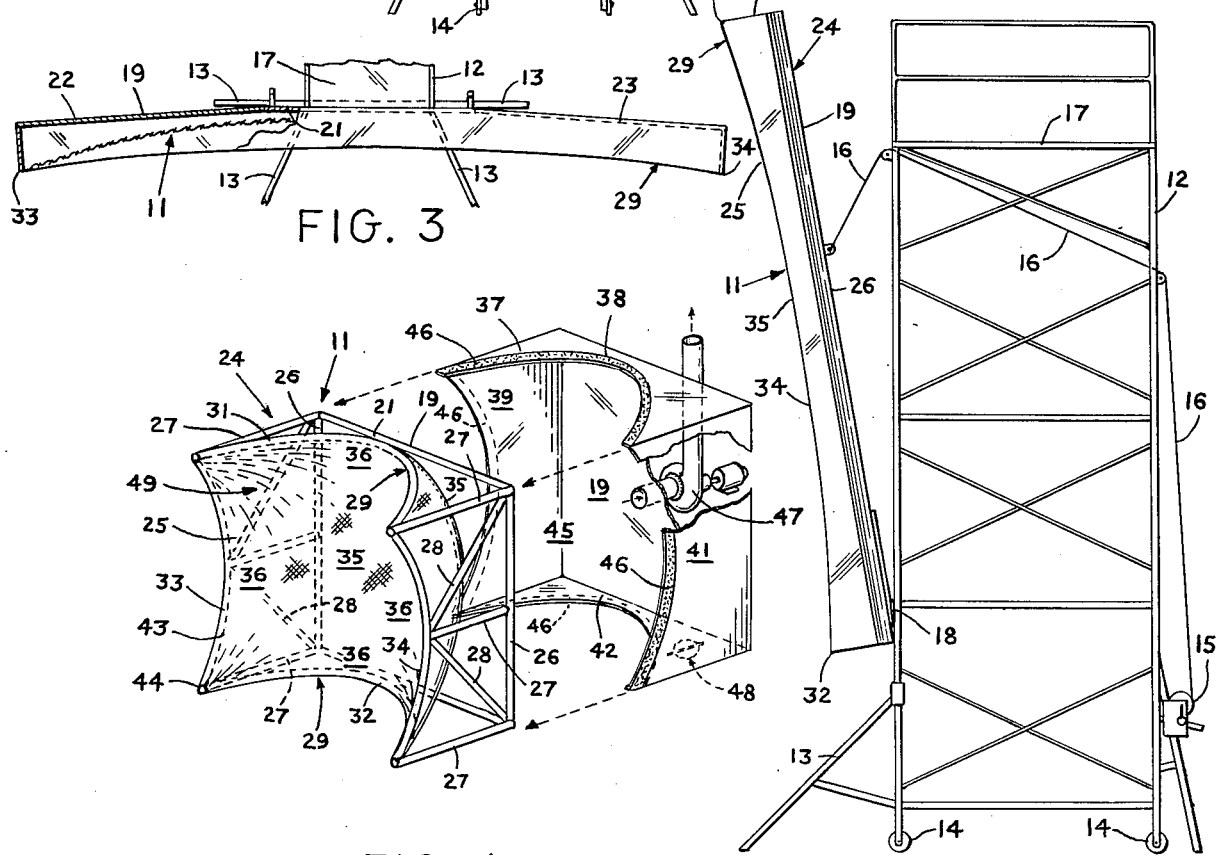

SCREEN FOR EXHIBITING PROJECTED IMAGES

BACKGROND OF INVENTION

Screens for exhibiting projected images have been provided with curvatures in their vertical and horizontal directions, but these curvatures have differed each from the other and they have been expensive to produce. Although large projection screens have sometimes been curved horizontally, only custom made large screens have been compound curved. Varying the curvature of the screens has not been feasible nor has it been convenient to assemble these screens. High gain screens must be curved; the higher the gain, the more accurately so.

STATEMENT OF INVENTION

This inventor has solved problems of the prior art with respect to screens for exhibiting projected images in a useful, novel, unobvious and particularly facile way. The inventor provides a boxlike frame with a rim formed about its front. He covers the front with a membrane having a margin which extends to the rim. He encloses the back of the frame with a cover connected in sealed engagement to the membrane about the rim so as to form a plenum. The inventor then withdraws gas from the plenum, whereby the membrane forms a concave image receiving surface having a relatively uniform curvature. By this expedient the image receiving surface approaches a spherical shape. Accordingly one object of this invention is to provide a screen of the character stated which has an image receiving surface that approaches a spherical shape.

Another object of this invention is to provide a screen of the character stated which can be manufactured and transported in sections and is adapted to be assembled to produce the complete screen. These sections can be transported by truck or railroad car and conveyed into buildings, stadiums and the like through ordinary doorways and readily installed in position expeditiously and without creating inconveniences.

Still another object of this invention is to provide a screen of the character stated which avoids or reduces the distorted view of the projected image obtained from positions close to and at the sides of the screen, thereby removing or reducing the disadvantages incidental thereto.

Still another object of this invention is to provide a screen of the character stated wherein forward bellying of the image receiving surface is eliminated.

Still another object of this invention is to provide a screen of the character stated which gives the projected image the effect of depth and solidity.

Still another object of this invention is to provide a screen of the character stated which reduces eye fatigue of the viewer. The fatigue results from constant efforts of the viewer to readjust impressions received to natural objects represented.

DESCRIPTION OF DRAWINGS

The foregoing and other objects, features and advantages will appear more fully from a detailed description of a preferred embodiment of this invention and from claims both viewed in conjunction with an accompanying drawing wherein:

FIG. 1 is a front elevational view of a screen according to this invention on a supporting tower.

FIG. 2 is a side elevational view of the screen and tower.

FIG. 3 is a top view of the screen.

FIG. 4 is a perspective view of a simplified version of the screen illustrating its structure and operative relationships.

DESCRIPTION OF PREFERRED EMBODIMENTS

As seen in the drawing, a screen (generally designated 11) for exhibiting projected images is mounted on a tower 12 which is provided with outriggers 13, casters 14, a winch 15, a cable 16 and upon which a platform 17 is provided. The screen 11 is connected to the tower 12 by hinges 18 and it is inclinable for aiming by operation of the winch 15. The hinges 18 also can be moved upward, outward or downward for aiming. The screen 11 is best assembled on its back 19 and then hoisted onto the tower by means of the winch 15. The screen also may be hung or stood up without the tower.

The screen may be a single unit 21 as shown in FIG. 4 or it may be arranged in a plurality of units 21, 22 and 23 as shown in FIG. 3, in which case a separate tower would be necessary for each unit. For simplicity the screen 11 will be discussed here with reference to FIG. 4. A boxlike frame (generally designated 24) with the back 19 and a front 25 has upright columns 26, cross beams 27 and diagonal braces 28. A rim (generally designated 29) is formed by means of an upper 31 and a lower 32 edge as well as side edges 33, 34 all of which project frontward. These edges 31, 32, 33, 34 are generally hyperbolic with curvatures of the upper 31 and the lower 32 edges being the same as each other and further with curvatures of the side edges 33, 34 being the same as each other. The front 25 of the frame 24 is covered by a membrane 35 (the screen) preferably of a vinyl material and having margins 36 which extend to the vicinities of the edges 31, 32, 33, and 34. A plenum cover 37 is pulled over the top 38, back 19, sides 39, 41 and bottom 42 of the frame 24 after the membrane 35 has been mounted by means of known lacings 43 and grommets 44. The plenum cover 37 is connected to the margin of the membrane 35 about the rim 29 so that a sealed plenum 45 is formed about the frame 24 by the membrane 35 cooperating with the plenum cover 37. A suitable means for fastening the plenum cover 37 to the margin of the membrane 35 is by VELCRO hook and loop fasteners 46.

When the plenum 45 is formed, gas (air) is exhausted from the plenum 45 by means of a flower 47 which is of constant output and regulated by means of a damper 48. As the gas is exhausted from the plenum 45, the membrane 35 is drawn into the frame 24 whereby the membrane 35 takes on a spherical concave shape with a relatively uniform curvature. If desired, the membrane 35 can be treated with epoxy or otherwise as known in the art to retain it permanently in its curved shape. The image receiving surface 49 is of material well known in screens of this type.

It will be apparent to those skilled in manufacture and use of screens for exhibiting projected images that wide deviations may be made from the foregoing preferred embodiment without departing from a main theme of invention set forth in claims which follow.

I claim:

1. A screen for exhibiting projected images and comprising:
    a boxlike frame having a front and a back with a substantially rectangular rim about the front,
    a membrane covering the front and having a margin extending to the vicinity of the rim, a cover enclosing the back of the frame and connected in sealed engagement to the margin of the membrane at the rim so as to define a plenum, exhaust means for withdrawing gas from the plenum whereby the membrane forms a concave image receiving surface curved in a relatively constant degree about a single point so that the image receiving surface takes on a spherical shape, means for varying the withhdrawing of the gas from the plenum whereby said degree of curvature is variable.

2. The screen of claim 1 with the rim concaved.

3. The screen of claim 1 with the rim including an upper and a lower edge as well as side edges, the upper and lower edges having the same curvature as each other and the two side edges having the same curvature as each other.

4. The screen of claim 3 with all of the curvatures hyperbolic.

* * * * *